(12) United States Patent
Isomäki et al.

(10) Patent No.: US 7,406,057 B2
(45) Date of Patent: Jul. 29, 2008

(54) METHOD FOR HANDLING OF MESSAGES BETWEEN A TERMINAL AND A DATA NETWORK

(75) Inventors: Markus Isomäki, Espoo (FI); Tuija Hurtta, Espoo (FI); Serge Haumont, Helsinki (FI)

(73) Assignee: Spyder Navigations L.L.C., Wilmington, DE (US)

( * ) Notice: Subject to any disclaimer, the term of this patent is extended or adjusted under 35 U.S.C. 154(b) by 897 days.

(21) Appl. No.: 10/493,809

(22) PCT Filed: Oct. 31, 2001

(86) PCT No.: PCT/EP01/12630

§ 371 (c)(1),
(2), (4) Date: Apr. 27, 2004

(87) PCT Pub. No.: WO03/039080

PCT Pub. Date: May 8, 2003

(65) Prior Publication Data

US 2004/0259532 A1 Dec. 23, 2004

(51) Int. Cl.
*H04Q 7/00* (2006.01)
(52) U.S. Cl. .................. 370/328; 370/338; 370/401
(58) Field of Classification Search .............. None
See application file for complete search history.

(56) References Cited

U.S. PATENT DOCUMENTS

| | | | |
|---|---|---|---|
| 6,707,813 B1 * | 3/2004 | Hasan et al. ............. | 370/356 |
| 7,065,339 B2 * | 6/2006 | Vallinen et al. ........... | 455/406 |
| 7,116,967 B2 * | 10/2006 | Kauppinen et al. ....... | 455/404.1 |
| 7,120,156 B2 * | 10/2006 | Foti et al. ................. | 370/401 |
| 2002/0064164 A1 * | 5/2002 | Barany et al. ............. | 370/401 |
| 2002/0126701 A1 * | 9/2002 | Requena ................... | 370/469 |
| 2002/0147824 A1 * | 10/2002 | Hurtta et al. .............. | 709/230 |
| 2003/0086410 A1 * | 5/2003 | Eikkula .................... | 370/352 |

FOREIGN PATENT DOCUMENTS

| | | |
|---|---|---|
| WO | WO 99/48310 | 9/1999 |
| WO | WO 00/70825 | 11/2000 |

OTHER PUBLICATIONS

3GPP TS 23.107 V3.4.0, Technical specification, "3rd Generation Partnership Project; Technical Specificatoin Group Services and System Aspects; QoS Concept and Architecture (Release 1999)"; pp. 1-36.
Puuskari Mikko "Quality of Service Framework in GPRS and Evolution Towards UMTS"; 3rd European Personal Mobile Communication Conference, Paris, Mar. 9-11, 1999; 7 sheets.

* cited by examiner

*Primary Examiner*—Bob A Phunkulh

(57) ABSTRACT

A method for handling of messages between a terminal and a data network, in which messages of a specific protocol are handled using correspondingly defined specific contexts for messages of the protocol. Messages based on the same specific protocol relate to different service categories. A message is received at the network, and an analysis of the message is performed to determine a service category of the received message. A different specific context is assigned to each received message dependent on the analyzed service category.

20 Claims, 4 Drawing Sheets

METHOD FOR HANDLING OF MESSAGES BETWEEN A TERMINAL AND A DATA NETWORK

FIELD OF THE INVENTION

The present invention concerns a method for handling of messages between a terminal and a data network as well as a corresponding network control entity and network access node and a data network.

BACKGROUND OF THE INVENTION

Recently, communication technology and data networks have experienced a large progress. Data networks for transmitting data either via fixed lines or for wireless transmission find increasing attention. Also, data and/or communication networks combining wireless and wirebound communication are under development. An example for such a network is the UMTS (Universal Mobile Telecommunication Standard) network currently under development and being standardized by 3GPP ($3^{rd}$ Generation Partnership Project). The 3GPP Release 5 UMTS network enables, among various other services, telephony using the Internet Protocol (IP) (VoIP, Voice over IP), or data transmission using the Internet Protocol.

The reference to the UMTS network, however, is not intended to be limiting the present invention and the present invention as described hereinafter may equally be used in other similar networks. However, in order to clearly describe the principles underlying the present invention, the UMTS network architecture is referred to as an example.

Generally, data (voice or other data) are transmitted in units of packets in the UMTS network. A terminal and/or user equipment UE communicates with an access node of the network, identified by an APN (Access Point Name), which node may for example be a GGSN node (Gateway GPRS Support Node, GPRS: General Packet Radio Service). Access node here means an entry node to the network part providing services and being independent of the actual connection technology, i.e. an entry point to the core network. Between the access node and the terminal there is arranged an access network, which in case of a mobile/wireless access comprises a radio access network consisting of radio network controllers RNC and Node_B's (corresponding to GSM base station controllers and base stations, respectively). Since, however, the access network is not concerned in the present invention, the detailed description thereof is omitted.

The access point node, i.e. GGSN, is adapted to communicate with a call state control functional entity CSCF. Generally, in the network part currently serving the terminal this is a so-called proxy CSCF, i.e. P-CSCF. Each terminal has allocated thereto a serving CSCF, S-CSCF located in the "home" network of the subscriber using the terminal. The CSCF in turn is connected to a HSS entity, Home Subscriber Server, largely corresponding in functionality to a HLR in GSM (Home Location Register).

With the progress in data network technology, more and more different services can be provided by the (core) network to the terminal registered thereto. A terminal UE is identified/addressed by an address to which the services are provided. Such an address is referred to as PDP address (Packet Data Protocol). For one such address several contexts, i.e. PDP contexts can be defined. Each context may be active or inactive. A context such as a PDP context has as features/parameters a PDP type identifying the type of protocol used, the PDP address itself as the address of the protocol, a Quality of Service (QoS) profile defining a default QoS for this PDP context, and a GGSN address/APN (Access Point Name) defining the access point of the terminal to the network, i.e. a logical address of the node and/or server that is serving this PDP context.

Note that the present invention is not limited to PDP contexts but any similar concept may likewise be applicable in connection with the present invention as long as a "protocol environment" and/or context is concerned.

Thus, for a terminal communicating via a specific APN/GGSN using a specific protocol, a specific QoS is defined. An example of such a protocol is the Session Initiation Protocol SIP. (Another example would be WAP, Wireless Application Protocol.) To keep the explanation simple, however, the subsequent description focuses on SIP, while this is to be noted as not limiting the present invention.

SIP is a multi-purpose protocol. On one hand it is used for setting up telephone calls (note that SIP does not carry the voice itself), where fast and reliable delivery of signaling messages is vital (QoS=real time (RT)). On the other hand it can be used to carry objects and initiate services which do not have hard real-time delivery requirements, such as instant messaging, presence updates (e.g. location area updates) or push services. ("Push service" is intended to mean any service which asynchronously sends some contents without being requested by the receiving side.)

In 3GPP Release 5, a signaling PDP context may be used to carry SIP signaling between a UE and P-CSCF. The signaling PDP context may require enhanced QoS, like e.g. higher priority than other PDP contexts. Enhanced QoS is important for SIP session setup messages, but not for all SIP messages. For example, SIP messages used for push services do not have to be carried using the enhanced QoS provided by the signaling PDP context.

This causes SIP traffic volume to be quite large, and makes ,signaling PDP provisioning difficult, since all SIP messages have to be treated similarly regardless of their real requirements. The problem will become significant especially when GERAN (GSM/EDGE RAN, EDGE=Enhanced Data Rates for GSM Evolution, RAN=Radio Access Network, GSM=Global Standard of Mobile Communication) access technology is used.

SUMMARY OF THE INVENTION

Hence, it is an object of the present invention to propose an improved method for handling of messages between a terminal and a data network which solves the above problems, as well as a corresponding network control entity and network access node and a data network.

According to the present invention, this object is for example achieved by a method for handling of messages between a terminal and a data network, wherein messages of a specific protocol are handled using defined specific contexts for messages of said protocol, and wherein messages based on the same specific protocol relate to different service categories, said method comprising the steps of: receiving a message at said network, analyzing said service category of said received message, and assigning a specific context to said message dependent on the analyzed service category.

According to advantageous further developments of the present invention, said assigning comprises the further step of marking said message dependent on the analyzed service category, and setting a routing indicator dependent on said marking, said routing indicator being adapted to selectively assign said specific context to said message;

said marking is effected by setting header information in said message to a value corresponding to the service category;

said marking is effected by setting Differentiated Service code points using the Differentiated Service bit field in the message header, (such as e.g. the IP (Internet Protocol) message header);

said marking is effected by setting transport protocol port numbers to a value corresponding to the service category;

said routing indicator to which said marking is mapped is a traffic flow template TFT;

said different service categories are indicated by a service type identifier included in the message, and said analyzing is based on said service identifier;

at a network node receiving said message there is defined a profile for each message type adapted to allocate a service category to each received message, and said analyzing is based on said profile, defining said specific contexts for messages of said protocol comprises the steps of: configuring part of mapping information allocating marking information to corresponding routing indicator information in response to a context activation request from said terminal to an access node of said data network, said context activation request is detected at said access node as a first context activation request and configuring is effected based on the fact that a first request is a request for a predetermined context, said context activation request indicates the requested context and configuring is effected based on the detected requested context, there are furthermore provided the steps of returning marking information used for marking packets from said data network to said terminal in response to a previous request from said terminal to said data network, subsequently requesting, from said terminal to said data network, the activation of a context using the marking information returned to said terminal in said returning step, and configuring part of mapping information using the returned marking information.

According to the present invention, this object is for example achieved by a data network control entity for use in a data network, wherein messages of a specific protocol are handled using defined specific contexts for messages of said protocol, and wherein messages based on the same specific protocol relate to different service categories, said entity comprising a transmission means adapted to receive a message at said network entity, an analyzing means adapted to analyze said service category of said received message, a marking means adapted to mark packets based on a result of said analysis by said analyzing means, wherein said transmission means is further adapted to forward said marked packets to a data network access node.

According to favorable refinements of said control entity, said marking means is further adapted to mark said message-dependent on the analyzed service category, said marking is effected by setting header information in said message to a value corresponding to the service category, said marking is effected by setting Differentiated Service CodePoints using the Differentiated Service bit field in the message header, said marking is effected by setting transport protocol port numbers to a value corresponding to the service category.

According to the present invention, this object is for example achieved by a data network access node for use in a data network, wherein messages of a specific protocol are handled using defined specific contexts for messages of said protocol, and wherein messages based on the same specific protocol relate to different service categories, said node comprising a transmission means adapted to receive marked packets from a data network control entity, a mapping means adapted to map a marking of a received packet to a routing indicator, and an assigning means adapted to assign a specific context to said message dependent on the mapped routing indicator.

According to a favorable refinement of said node, said routing indicator to which said marking is mapped is a traffic flow template TFT.

Moreover, according to the present invention, this object is for example also achieved by a data network comprising at least a data network control entity according to the above, and at least a data network access node according to the above.

By virtue of the present invention being implemented in a data network, the following advantages can be achieved:

it can be avoided that all SIP traffic is going through a signaling PDP context, the use of SIP signaling messages can be controlled, if non-signaling (e.g. no call establishment) related SIP messages are used, these can be made to go through a non-signaling PDP context, PDP contexts can be distinguished based on DifferentiatedService Codepoints (DiffServ Codepoints and/or DS Codepoints), and QoS for different SIP messages can be assigned based on the DiffServ Codepoints, real-time traffic can be separated from non-real-time traffic in terms of the context used for the respective traffic, messages of a specific protocol type can thus be distributed to several simultaneous contexts, the terminal can be informed about the packet marking practice of the network.

Stated in other words, according to the present invention, SIP messages which do not require enhanced QoS (as required for (real-time) signaling) are not carried on the signaling PDP context. The UE may activate another PDP context for those messages (requiring non-real-time QoS). The UE, however, is provided with information from the network in order to set the traffic flow templates TFTs of those PDP contexts correctly. With correct TFTs, GGSN/APN can send SIP messages requiring real-time QoS, e.g. those related to session setup on a different PDP context than SIP messages not requiring real-time QoS, e.g. those related to other services (such as push services).

BRIEF DESCRIPTION OF THE DRAWINGS

The present invention will subsequently be described in detail with reference to examples as illustrated in the accompanying drawings, in which FIG. 1 schematically shows a user equipment and network entities involved in connection with the present invention and corresponding signaling/method steps.

DETAILED DESCRIPTION OF THE EMBODIMENTS

Figure 1:
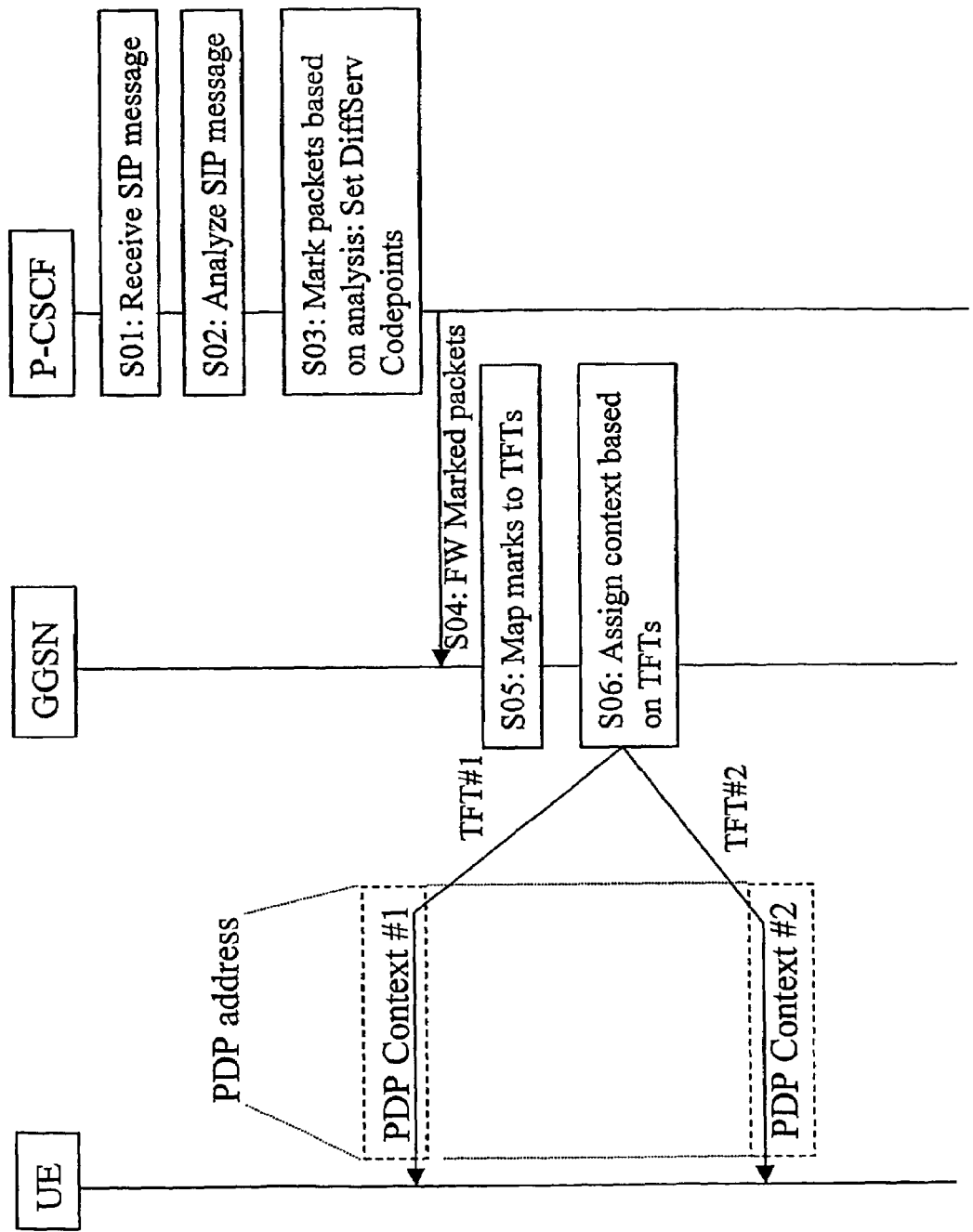

Subsequently, the present invention will be described in detail by way of example with reference to the drawings.

Accordingly, as is derivable from the foregoing, the present invention concerns a method for handling of messages between a terminal and a data network (represented by, e.g., a network node such as a P-CSCF), wherein messages of a specific protocol (e.g. SIP messages) are handled using defined specific contexts (e.g. PDP contexts) for messages of said protocol, and wherein messages (SIP signaling messages (with real-time QoS requirements) and/or SIP payload delivering messages (without real-time QoS requirements) such as SIP push) based on the same specific protocol (SIP) relate to different service categories, namely signaling (real-time) service and delivering (non-real time) services, respectively.

According to the present invention, a message is received at said network, said service category of said received message is analyzed (signaling/real-time or non-real-time), and a specific context is assigned to said message dependent on the analyzed service category.

Different SIP messages and even payload types are carried with different QoS. Specifically, this means that e.g. in 3G environment not all SIP messages have to be carried within a signaling PDP context, but some can be classified to be carried as best-effort data (non-real time traffic).

According to the present invention, this can for example be achieved by:

Defining a profile for User Agents and Proxies (in 3G: CSCFs), which states the default QoS requirements for each SIP message type, i.e. call-related message (for call attempt signaling purposes) or best-effort message (for data delivery, non-real time), or any other messages not related to call attempt signaling. Stated in other words, for example, the message names are mapped to message types, which types are mapped to service categories.

Dependent on the message type and/or service category (i.e., for example message name such as SIP INVITE), the P-CSCF decides that a signaling PDP context is required or some other PDP context is required.

In addition, a subscriber can make his/her own policies utilizing any information carried in SIP messages, and in this way override the default rules set by the network operator.

Such a profile defines the policy for an action to be taken on the message. The policy is known (stored beforehand) to (at) the CSCF, or is downloaded to the CSCF (e.g. from a HSS) and/or updated when a terminal registers to the network. Thus, stated in other words, at a network node receiving said message there is defined a profile for each message type adapted to allocate a service category to each received message, and said analyzing of the message is based on said profile. The node may be the Serving CSCF or any other node within the network via which the messages are expected to travel and/or be routed. The profile may even be stored at a terminal UE for analyzing terminal originated messages.

Alternatively and/or additionally, allowing the possibility of explicit indication of the service type in the messages themselves is also possible. This can be done e.g. by using header fields. Hence, either a new header-field can be defined serving for this purpose (e.g. an Event field), and/or existing header fields may be used such as the DiffServ Codepoints.

A DiffServ Codepoint (DiffServ or DS stands for Differentiated Services) is a 6 bit field in the IP header of each packet and the contents thereof defines how a packet should be treated by routers and/or network nodes through which the packet travels.

Thus, the 6-bit field represents a QoS attribute for the packet(s), according to hitherto existing standards (e.g. 3GPP TS 23.107 V3.4.0 (2000-10), page 31), allowing different application specific QoS levels for the same PDP context. However, when using DiffServ Codepoints in connection with the present invention as described herein, DiffServ Codepoints even enable the selection of different PDP contexts dependent on the setting of the DiffServ Codepoints. Thus, setting DiffServ bits according to the detected/analyzed service type of the received message can be regarded as marking said message dependent on an analyzed service category using DiffServ bits.

The analysis performed by the receiving network node can be based not only on the service type but alternatively and/or additionally on the source or destination address parameters of the message.

It is to be noted that an above mentioned explicit indication could be applied even for different payloads (within the same message type). In this case e.g. the receiving network node such as P-CSCF could strip off non-priority and/or non-real-time (NRT) payload from otherwise real-time (RT) message and send it with an appropriate later message or give a reference to it as a URL (Uniform Resource Locator).

Using the above mentioned IP DiffServ bits to indicate the service category at IP-level will now be set out in greater detail. For example if P-CSCF in 3G determines that a certain SIP message should be treated as best-effort (NRT type service category), it sets/marks the DiffServ bits accordingly. In GGSN this would cause the IP-packet carrying the SIP message to be classified to a different PDP context from the signaling PDP, in this case for best-effort class PDP. This in turn means that the terminal UE has to know e.g. what DiffServ Codepoints will be used by the CSCF in order that the terminal is enabled to set the TFTs correctly at the access node, i.e. GGSN.

TFT means Traffic Flow Template and represents a parameter which is needed because of multiple PDP contexts per IP address (i.e. per terminal). The TFT parameter is delivered in uplink direction (from the terminal UE to the network), more specifically, from the terminal to the GGSN as an access node/access point name APN of the network. The GGSN is then enabled to route packets to the correct PDP context based on the TFTs. Stated in other words, packets to be delivered via the GGSN to the terminal are demultiplexed to different PDP contexts based on the TFTs. Thus, the TFT represents a routing indicator adapted to selectively assign a specific context to said message. The routing indicator in turn has to be set dependent on said marking. (DiffServ Codepoints are mapped to the correct TFTs and the terminal informs the GGSN accordingly or GGSN knows already which TFTs are to be used for which DiffServ Codepoints, as will be described later on.)

Alternatively, instead of DiffServ Codepoints, also transport protocol port numbers could be used in connection with the present invention.

FIG. 1 exemplifies a signaling and method steps according to the present invention. For the purpose of FIG. 1 it is assumed that the TFTs are correctly set in the GGSN. (Setting of TFTs will be detailed hereinafter in connection with FIGS. 2 to 4.)

As shown in FIG. 1, in step S01 the network (here P-CSCF node) receives a message such as a SIP message. (For the purpose of the description of the present invention, the origin of the received message is of subordinated interest and a description thereof is therefor omitted.) The message is analyzed in step S02 in order to determine the service category associated to said message, e.g. real-time/signaling service or non-real time. Based on the analysis, the network (P-CSCF node) marks data packets of said message by setting header information in said packets indicating the service category of the message. (This can be accomplished for the message as a whole or on a per data packet basis for the packets contained in said message). The header information set are e.g. the DiffServ CodePoints, as explained beforehand. In step S04 the marked packets of the message are forwarded to the GGSN for delivery to the terminal to which the message is addressed.

At the GGSN, in step S05, the set markings are mapped to TFTs. For example, assuming that a service category "signaling"/(real-time) call establishment has led to a marking DiffServ 001010, while a service category non-real time (e.g "push") has led to a marking DiffServ 001110, then DiffServ 001010 will be mapped to TFT#1, while DiffServ 001110 will be mapped to TFT#2.

Based on the thus assigned/mapped TFTs for the data packets the GGSN then knows that packets having a TFT as a routing indicator of TFT#1 are to be routed to the terminal using a first PDP context (PDP Context#1), while the others are to be routed to the terminal using another PDP context, i.e. PDP Context#2 in the illustrated example. Both PDP contexts belong to the same PDP address defined between the terminal and the GGSN concerned.

Thus, according to the present invention, there is assigned a specific context to said messages dependent on the analyzed service category.

The setting of TFTs will now be described in connection with FIGS. 2 to 4.

In general and as has been described above, a terminal UE activates a signaling PDP context for SIP messages used for session setup and another PDP context for SIP messages used for other services (e.g. push services, instant messaging, presence or the like). The P-CSCF marks SIP messages used for session setup differently from SIP messages used for other services. P-CSCF knows the services e.g. by checking the Event parameter included in the SIP message. Marking may be based e.g. on different source port numbers, different DiffServ codepoints or different flow labels.

The terminal UE has to be aware of the packet marking (i.e. which packets are marked in which manner based on the service category to which they refer) in order to set TFTs correctly. The terminal UE gets this information from the external network providing the services (i.e. in this case, from the IP multimedia subsystem as for example represented by the P-CSCF node).

Figure 2:
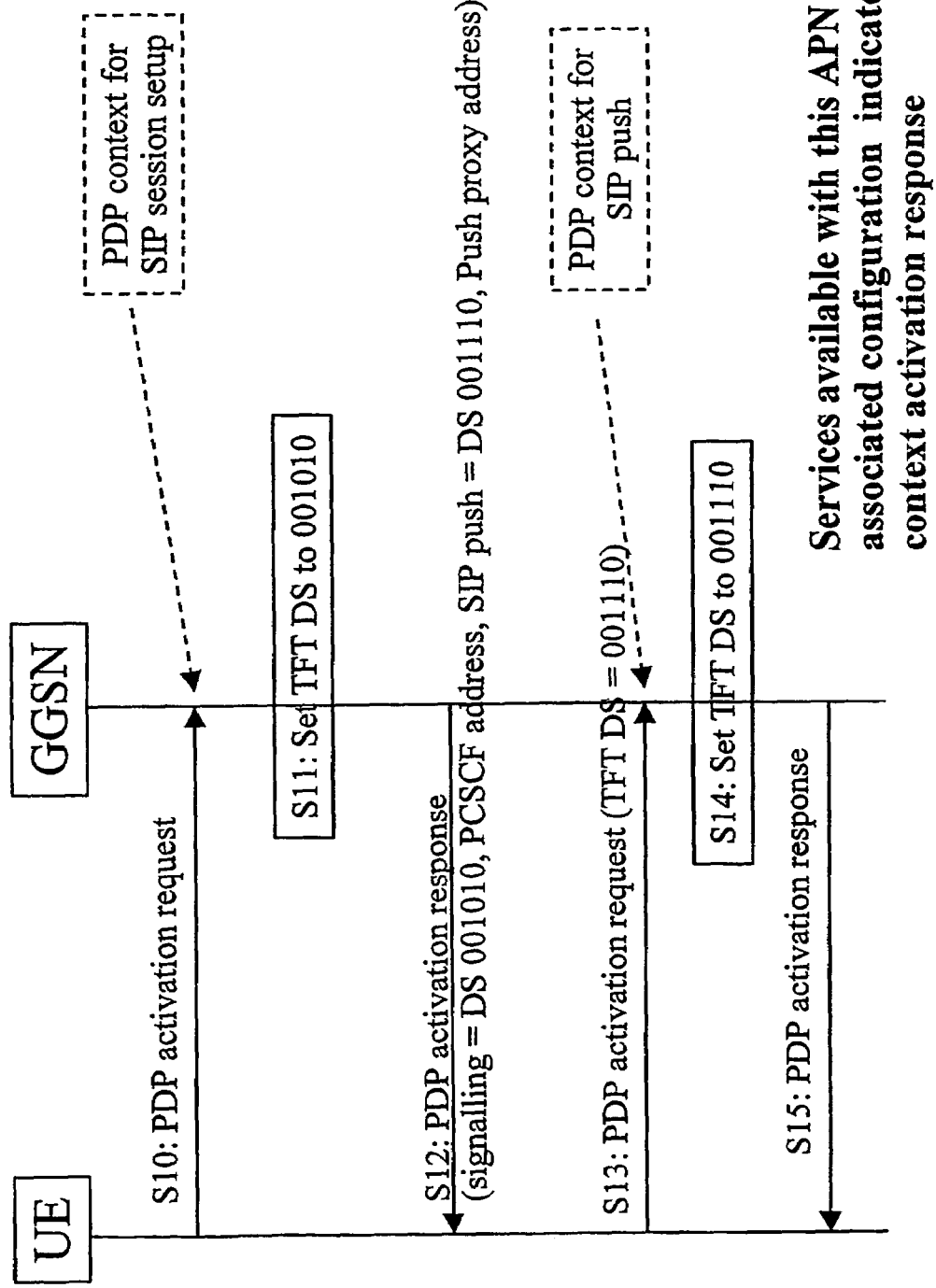
FIG. 2 shows a first signaling scenario in connection with the present invention for correctly setting TFTs.
Figure 3:
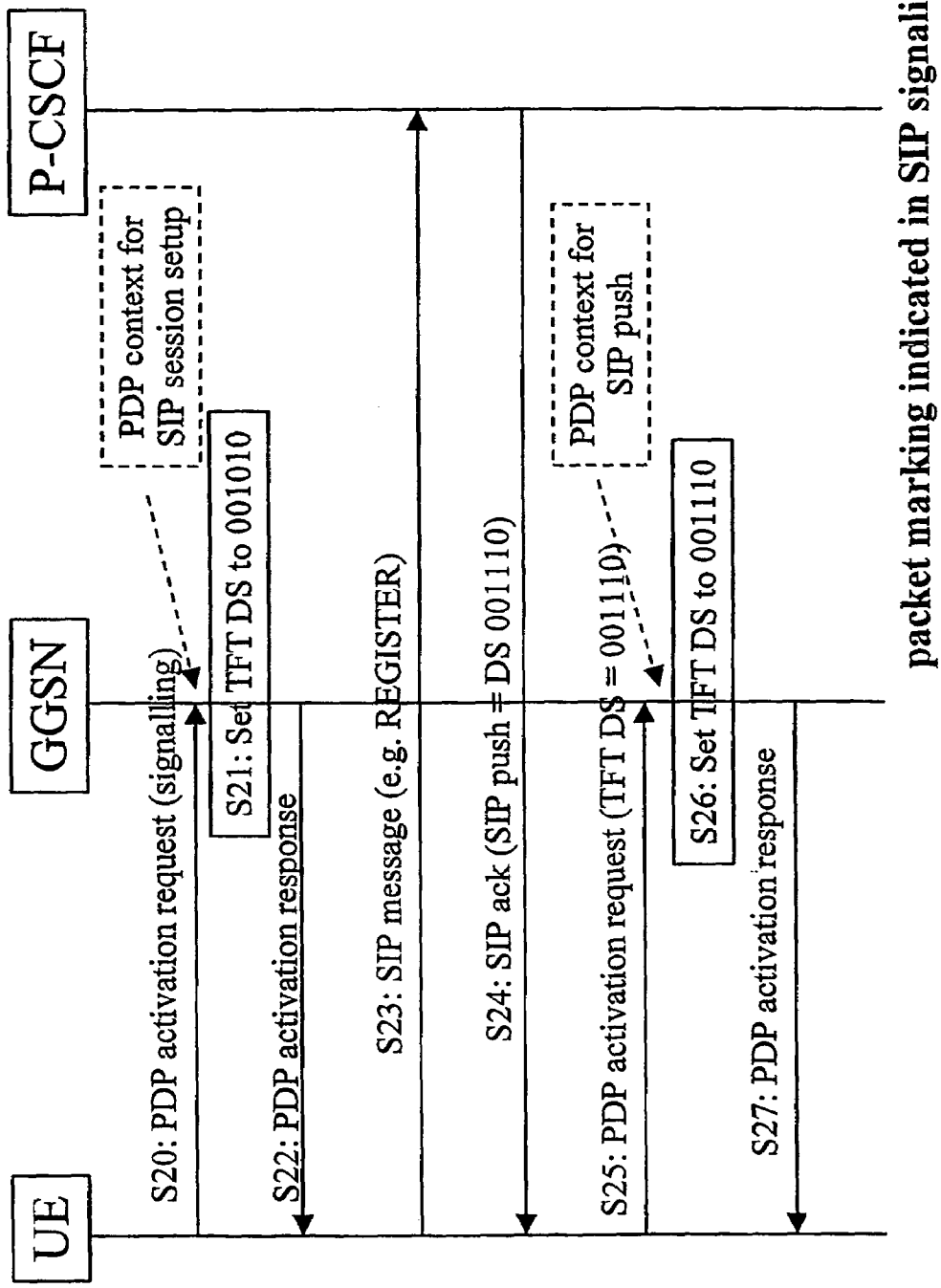
FIG. 3 shows a second signaling scenario in connection with the present invention for correctly setting TFTs.

The terminal UE may get information on the packet marking when first contacting an application server (P-CSCF) in the external network (e.g. FIG. 3, as a reply (step S24) to REGISTER or SUBSCRIBE messages (step S23)) or when activating the first PDP context towards the external network (FIG. 2, step S12 in reply to step S10). Typically, the first PDP context will be a signaling PDP context towards the IP multimedia subsystem.

An example of this information, as mentioned earlier, is "SIP real-time delivery=DiffServ 001010, SIP non-real time delivery=DiffServ 001110". Note that in the Figures, "real-time delivery" is represented by the example of "session setup", while "non-real-time delivery is exemplified by referring to "push". When receiving this information, UE can set the TFTs correctly (i.e. instruct the GGSN to set the TFTs correctly) and thus receives SIP messages related to e.g. session setup on a different PDP context than SIP messages related to e.g. push services.

As depicted in FIG. 2, GGSN will insert in first PDP context activation response (step S12) a list of services or application ID with for each service additional configuration information (DiffServ codepoints, application server address (e.g. Proxy CSCF, push proxy or presence server address, or WAP gateway address, or instant messaging server address)). Then, when requesting a PDP activation for a SIP non-real time services (e.g. "push" as shown in step S13), the GGSN is informed by the UE of the TFT to be set and/or of the DiffServ Codepoints to be mapped to the thus set TFT and sets the TFT accordingly (Step S14) [Similar to steps S25 to S27 in FIG. 3].

Further, the GGSN is implemented (not shown in the figures) to update the terminal UE if some parameters are added or modified (e.g. a new service is offered). This may be implemented by sending "Modify PDP Context" to all UE having at least one active PDP context in this Access Point Node.

Figure 4:
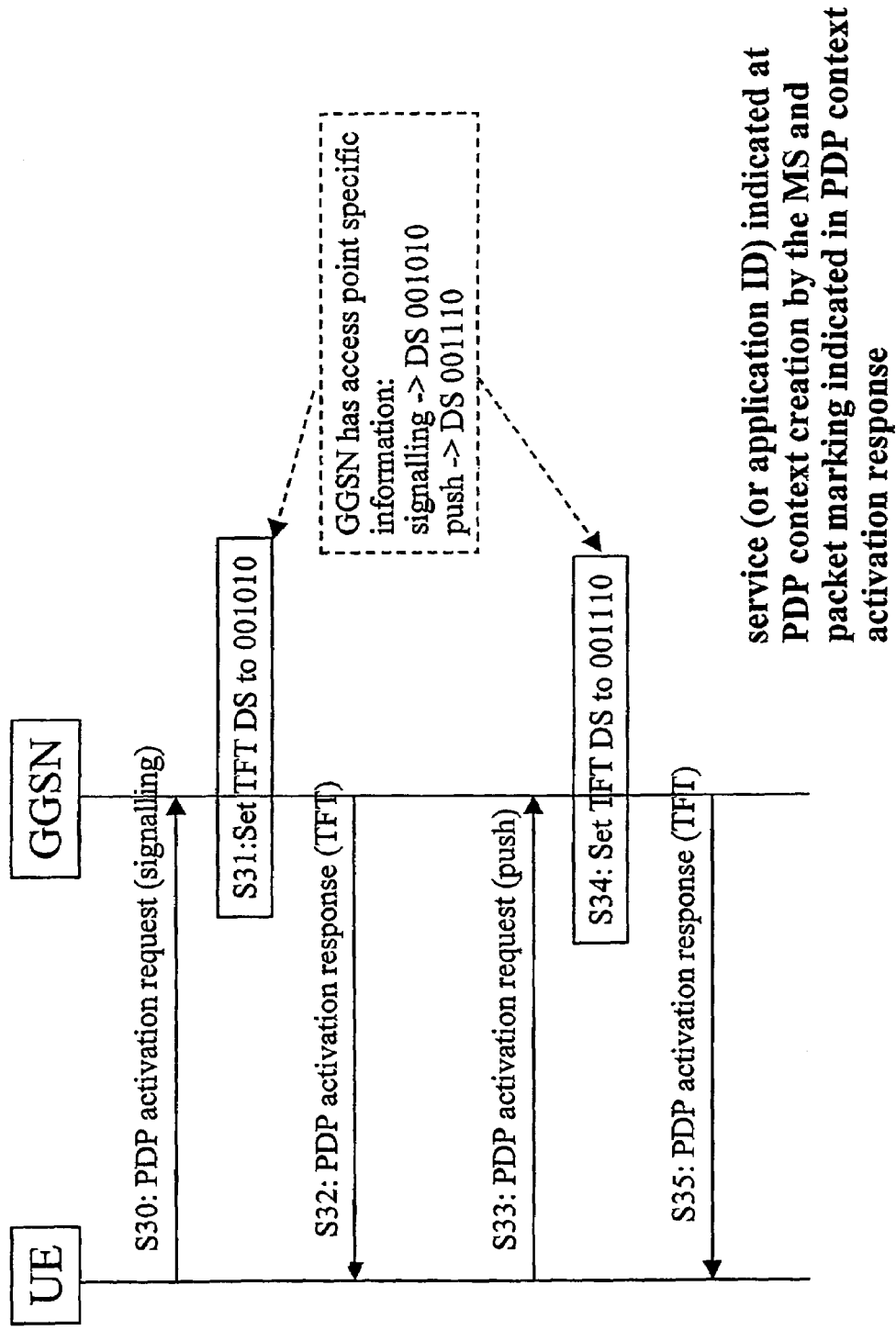
FIG. 4 shows a third signaling scenario in connection with the present invention for correctly setting TFTs.

As an alternative shown in FIG. 4, GGSN may have access point specific information on the packet marking for every service. This information may be configured to GGSN, or GGSN may receive this information from a policy server (e.g. the HSS). The terminal UE indicates the service (SIP session setup/signaling /real time, SIP push/non-real time) or application ID(s) at PDP context activation (S30, S33), and GGSN sets TFT (used for downlink) correctly (S31, S34). In addition, GGSN may have to send the TFT used for uplink traffic to UE.

It is important to note that many applications may use the same PDP context, so the MS may indicate in the activate PDP request a list of service or application ID.

Also, when an application needing a PDP context is activated, the UE first checks if a suitable PDP context is already activated. If it is, then the UE adds this application on the list of application using this PDP context, and, if this application needs configuration information, it will indicate this new application to the network with a "modify PDP context". If it is not activated, the UE will activate a proper PDP context (possibly a secondary) for this application, and indicate this application in the PDP context activation request message. It should be noted, that when the UE is switched on, many applications are expected to be automatically activated, and the UE could immediately send the list of all applications sharing a given PDP context.

It is to be noted that although the foregoing description mainly focuses on some specific examples of service categories, the invention is not limited thereto. Further examples of service categories may be real time RT, non-real time NRT, signaling, best-effort, push, WAP-email, interactive, background, instant messaging, or many others as long as they may be distinguishable in terms of quality of service QoS. Also, the number of PDP contexts need not be limited to two as shown in FIG. 1 but can be generalized to be n, dependent on the number of different service categories enabled to be handled by the terminal UE. Still further, SIP has been chosen as a mere example for a message protocol and likewise WAP messages could be handled without departing from the idea underlying the present invention.

In addition, although the above description has been given mainly with a focus on the implemented method, it is to be understood that the present invention concerns also a correspondingly adapted network comprising at least a control entity CSCF and an access node GGSN.

In detail, a data network control entity (CSCF) for use in a data network, wherein messages of a specific protocol are handled using defined specific contexts for messages of said protocol, and wherein messages based on the same specific protocol relate to different service categories, comprises a transmission means adapted to receive a message at said network entity, an analyzing means adapted to analyze said service category of said received message, a marking means adapted to mark packets based on a result of said analysis by said analyzing means, wherein said transmission means is further adapted to forward said marked packets to a data network access node (GGSN).

Further, a data network access node (GGSN) for use in a data network, wherein messages of a specific protocol are handled using defined specific contexts for messages of said protocol, and wherein messages based on the same specific protocol relate to different service categories, comprises a transmission means adapted to receive marked packets from a data network control entity (CSCF), a mapping means adapted to map a marking of a received packet to a routing indicator, and an assigning means adapted to assign a specific context to said message dependent on the mapped routing indicator.

Accordingly, as has been described herein above, the present invention relates to a method for handling of messages between a terminal and a data network, wherein messages of a specific protocol are handled using defined specific contexts for messages of said protocol, and wherein messages based on the same specific protocol relate to different service categories, said method comprising the steps of: receiving a message at said network, analyzing said service category of said received message, and assigning a specific context to said message dependent on the analyzed service category. The present invention also relates to a network control entity, an access node and a network comprising the same.

Although the present invention has been described herein above with reference to its preferred embodiments, it should be understood that numerous modifications may be made thereto without departing from the spirit and scope of the invention. It is intended that all such modifications fall within the scope of the appended claims.

The invention claimed is:

1. A method for handling of messages between a terminal and a data network, wherein messages of a specific protocol are handled using defined specific contexts for messages of said protocol, and wherein messages based on the same specific protocol relate to different service categories, said method comprising the steps of:
    receiving a message at said network,
    analyzing said service category of said received message, and
    assigning a specific context to said message dependent on the analyzed service category,
    wherein contexts for messages of a specific protocol rely on a same context address defined between the terminal and the data network, and
    wherein said assigning comprises the further step of marking said message dependent on the analyzed service category, and setting a routing indicator dependent on said marking, said routing indicator being adapted to selectively assign said specific context to said message.

2. A method according to claim 1, wherein said marking is effected by setting header information in said message to a value corresponding to the service category.

3. A method according to claim 2, wherein said marking is effected by setting Differentiated Service CodePoints using the Differentiated Service bit field in the message header.

4. A method according to claim 1, wherein said marking is effected by setting transport protocol port numbers to a value corresponding to the service category.

5. A method according to claim 1, wherein said routing indicator to which said marking is mapped is a traffic flow template TFT.

6. A method according to claim 1, wherein said different service categories are indicated by a service type identifier included in the message, and said analyzing is based on said service type identifier.

7. A method according to claim 1, wherein at a network node receiving said message there is defined a profile for each message type adapted to allocate a service category to each received message, and said analyzing is based on said profile.

8. A method according to claim 7, wherein said profile for each message type defines a policy for an action to be taken on said message.

9. A data network control entity for use in a data network, wherein messages of a specific protocol are handled using defined specific contexts for messages of said protocol, and wherein messages based on the same specific protocol relate to different service categories, said entity comprising:
    a transmission means adapted to receive a message at said network entity,
    an analyzing means adapted to analyze said service category of said received message,
    a marking means adapted to mark packets based on a result of said analysis by said analyzing means,
    wherein said transmission means is further adapted to forward said marked packets to a data network access node, and
    wherein contexts for messages of a specific protocol rely on a same context address defined between the terminal and the data network access node.

10. An entity according to claim 9, wherein said marking means is further adapted to mark said message dependent on the analyzed service category.

11. An entity according to claim 10, wherein said marking is effected by setting header information in said message to a value corresponding to the service category.

12. A method according to claim 11, wherein said marking is effected by setting Differentiated Service CodePoints using the Differentiated Service bit field in the message header.

13. A method according to claim 10, wherein said marking is effected by setting transport protocol port numbers to a value corresponding to the service category.

14. A data network comprising at least a data network control entity according to claim 9, further comprising a data network access node for use in a data network, wherein messages of a specific protocol are handled using defined specific contexts for messages of said protocol, and wherein messages based on the same specific protocol relate to different service categories, said node comprising a transmission means adapted to receive marked packets from a data network control entity, a mapping means adapted to map a marking of a received packet to a routing indicator, and an assigning means adapted to assign a specific context to said message dependent on the mapped routing indicator, wherein contexts for messages of a specific protocol rely on a same context address defined between the terminal and the data network.

15. A data network access node for use in a data network, wherein messages of a specific protocol are handled using defined specific contexts for messages of said protocol, and wherein messages based on the same specific protocol relate to different service categories, said node comprising:
    a transmission means adapted to receive marked packets from a data network control entity,
    a mapping means adapted to map a marking of a received packet to a routing indicator, and
    an assigning means adapted to assign a specific context to said message dependent on the mapped routing indicator, wherein contexts for messages of a specific protocol rely on a same context address defined between the terminal and the data network.

16. An access node according to claim 15, wherein said routing indicator to which said marking is mapped is a traffic flow template.

17. A method for handling of messages between a terminal and a data network, wherein messages of a specific protocol are handled using defined specific contexts for messages of said protocol, and wherein messages based on the same specific protocol relate to different service categories, said method comprising the steps of:

receiving a message at said network, analyzing said service category of said received message, and assigning a specific context to said message dependent on the analyzed service category, wherein contexts for messages of a specific protocol rely on a same context address defined between the terminal and the data network, wherein defining said specific contexts for messages of said protocol comprises the steps of: configuring part of mapping information allocating marking information to corresponding routing indicator information in response to a context activation request from said terminal to an access node of said data network.

18. A method according to claim 17, wherein said context activation request is detected at said access node as a first context activation request and configuring is effected based on the fact that a first request is a request for a predetermined context.

19. A method according to claim 17, wherein said context activation request indicates the requested context and configuring is effected based on the detected requested context.

20. A method according to claim 17, further comprising the steps of returning marking information used for marking packets from said data network to said terminal in response to a previous request from said terminal to said data network, subsequently requesting, from said terminal to said data network, the activation of a context using the marking information returned to said terminal in said returning step, and configuring part of mapping information using the returned marking information.

* * * * *